3,563,856
THERMIONIC FUEL ROD WITH NUCLEAR FUEL
Franz Gross, Neckargemund, Alfred Jester, Speyer, Rudolf Krapf, Leimen, and Hubert Holick, Lampertheim, Germany, assignors to Brown, Boveri & Cie A.G., Mannheim-Kafertal, Germany, a German corporation
Filed Aug. 2, 1967, Ser. No. 657,820
Claims priority, application Germany, Aug. 5, 1966, B 88,345
Int. Cl. G21c 3/02
U.S. Cl. 176—68       7 Claims

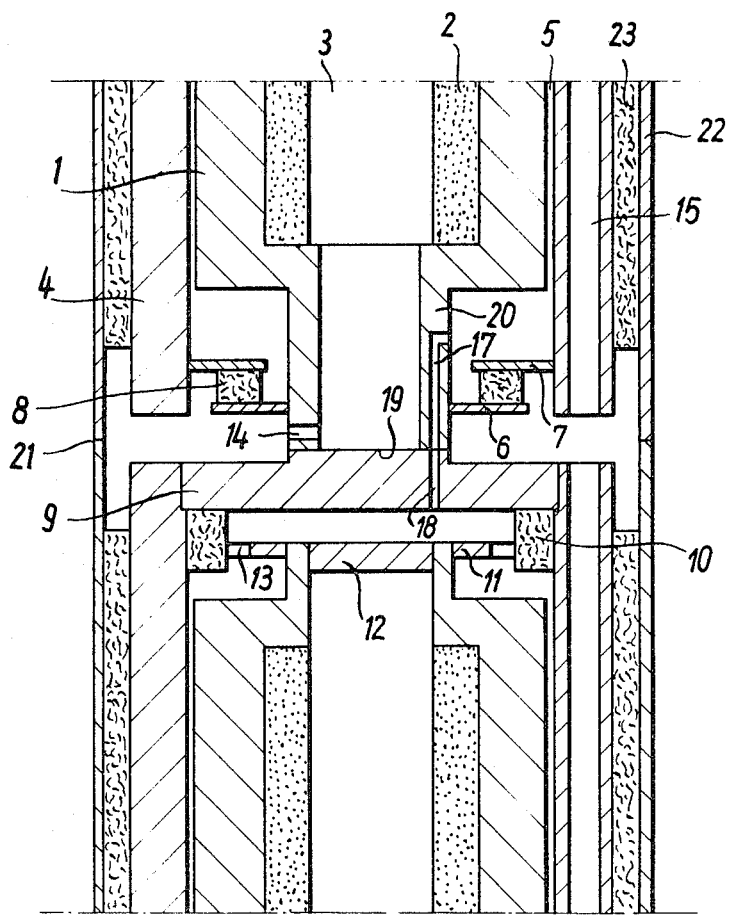

ABSTRACT OF THE DISCLOSURE

This invention relates to thermionic fuel elements, provided with nuclear fuel, for direct conversion into electrical energy of heat produced by nuclear fission. The thermionic elements comprise tubular, concentrically positioned emitters (1) and collectors (4). The fuel elements are electrically connected in series and are provided with respective discharge chambers (5) which are separated from each other by novel vacuum-tight seals, the seals providing a mechanical and electrical separation of the respective thermionic elements. The discharge chamber, provided at one end of each thermionic element, is filled with cesium vapor. The novel seal comprises a disc-shaped rigid metal-ceramic component (6, 7) at one end, and a pliable or yieldable metal-ceramic portion acting as a guide ring (10, 11) at the other end, acting in combination with a vacuum-tight plate (9).

Thermionic converters serve the purpose of directly converting heat energy into electrical energy. For background information, reference is made to the co-pending commonly owned application of Kurt Stahl, Reinhart Langpape, and Ned S. Rasor entitled Nuclear Reactor with Thermionic Converters, Ser. No. 637,822, filed May 11, 1967.

In general, thermionic converters comprise two closely adjacent electrodes, one of which, in the form of an emitter, is intensely heated to the extent that electrons are emitted from one electrode, the electrons then entering into the other electrode which constitutes the collector. The difference of the released energy or work can be recovered as electrical energy.

One of the disadvantages of known thermionic emission tubes is that a negative space charge builds up in front of the electron emitting surface, and this charge limits a further release or emission of electrons. For this reason, it is desirable to prevent such charge build-up, and to avoid the formation of a space-charge cloud in the electrode space of a thermionc converter.

It is therefore an object of the present invention to provide a thermionic fuel rod which may be used with nuclear fuel, wherein the fuel rod is comprised of a plurality of thermionic elements electrically connected in series, the respective elements having tubular concentrically positioned emitters and collectors defining therebetween vacuum-separated electrode spaces.

Another object of this invention is to provide means for preventing the formation of a space-charge cloud in the electrode space of a thermionic converter.

To these ends, and in accordance with one feature of the invention, the space between the two closely adjacent electrodes may be selected to be very small (in the range of 0.01 mm.). Alternatively, the negative space charge may be compensated by positive ions, so that a larger electrode space (greater than 0.1 mm.) then becomes possible.

According to another feature of the invention, cesium has been found to be particularly preferable as a filling gas because of its small ionization energy.

Nuclear energy may be used in a known manner as a source of heat for the thermionic converters of the present invention. Nuclear fuel and the thermionic converter are assembled into the individual thermionic elements, and several of these elements are connected electrically in series and combined into a thermionic fuel rod. In such case, the nuclear fuel is located inside of the emitter, and a fission gas chamber is provided for pumping off the fission gases which are created during the nuclear fission. These fuel rods, together with the moderator, the reflector and the regulating rods, form the core of a nuclear reactor, which is usually cooled with a liquid metal, for example sodium.

For further background information, reference is made to the German technical magazine "Atomkernenergie," volume No. 9/10, 1965, page 365, which describes a known construction of an arrangement of thermionic elements in a common outside pipe. The coolant circulates around the pipe, and a ceramic layer is provided to insulate the thermionic elements from said pipe. In this known construction, the emitter of each cell is held by membranes or diaphragms which serve to center the emitters and at the same time to balance or compensate the thermal expansions of the emitter.

It is also known to guide the flow of an electron current which is being released from an emitter surface and impinging upon the respective collector, to the emitter of the next adjacent thermionic element, the known guide being a metallic intermediary member or diaphragm. The intermediary element is arranged in such a way that all cells of the thermionic fuel rod will be electrically connected in series.

However one of the great disadvantages of such prior-art arrangements is that overall control can be possible only after all of the individual thermionic elements have been assembled into the total unit. The failure or loss of one individual cell results in a non-functioning of the entire thermionic fuel rod. The resulting waste which occurs may be considerably reduced, however, if it were possible to examine the thermionic elements individually prior to their assembly into the complete unit. To afford such a possibility is one of the objects of the present invention.

It is therefore another object of the present invention to provide an intermediary structure between the emitter surface and the collector of a respective thermionic element which affords a possibility of examining the thermionic elements individually prior to their assembly with other adjacent thermionic elements into a composite unit.

Accordingly, the present invention is characterized by the fact that means are provided for mechanically and electrically separating adjacent thermionic elements by maintaining a vacuum-tight seal for the discharge chambers of each respective thermionic element. These discharge chambers are sealed at one end by a rigid metal-ceramic component, and sealed at the other end by a yieldable metal-ceramic component as well as by a vacuum-tight plate.

In accordance with a special embodiment of the present invention, the emitter of each thermionic element is provided at one end thereof with a tubular projection which forms a mechanical and electrical connection with the collector of the neighboring cell. This projection has a connecting passage which joins with the fission gas chamber and with the discharge pipe of the fuel rod. The projection also has a second connecting passage joined to the discharge chamber of the adjacent thermionic element.

In the drawing:
The figure illustrates a longitudinal cross section of a thermionic fuel rod embodying the present invention.

As shown in the drawing, the emitter 1 carries, on its inner side and within it, the nuclear fuel 2 which forms a border circumferentially around the fission gas chamber 3. The gas chamber 3 serves to receive the fission gases which occur during nuclear fission. A discharge chamber 5 is defined as a space between the emitter 1 and the collector 4, and this discharge chamber 5 is filled with cesium vapor. The discharge chamber 5 is provided with novel vacuum-tight seals as further explained below.

The rigid metal-ceramic structural component of the seal is comprised of a pair of disc-shaped metal portions 6 and 7, electrically insulated from each other by a ceramic intermediary ring 8. The emitter 1 forms a tubular projection 20, and in combination with a plate 9 which extends transversely across the lower end of the emitter 1, affords a rigid fixing of the lower end of the emitter 1 in axial as well as in a radial direction. The respective heat resistances of the tubular projection 20, the collector 4 and the plate 9 are so selected and dimensioned that the rigid metal-ceramic component 6, 7, 8 remains at a substantially uniform temperature. This assures the abovementioned rigid fixing of the lower end of the emitter 1 in axial and radial directions.

In order to compensate for and take into account the variable thermal expansion of the electrodes, in accordance with a further feature of the invention a yieldable vacuum-tight seal is provided at the other end of the thermionic element. This yieldable seal comprises a guide ring 11, adapted to glide along a ceramic guide 10. The guide ring 11 and ceramic guide 10 act to maintain the various components concentric and thus serve to compensate for and balance any thermal expansion which occurs. The ceramic guide 10 provides, in addition, electrical insulation between the emitter 1 and the collector 4. The plate 9 serves to electrically connect the emitter 1 with the collector 4 of the series-connected cell in such manner that all cells are connected electrically in series. A plate 12 is provided at the front face of the emitter 1 to prevent the penetration of fission gases into the cesium-vapor-filled discharge chamber 5.

Ducts 13 are provided in the guide ring 11, there being no clearance between guide ring 11 and the ceramic guide 10. Similarly, a passage or channel 18 is provided in the plate 9. These ducts and passages 13, 18 serve to maintain the discharge chambers of all the thermionic elements at the same pressure by being interconnected. The plate 12 at the front face of the emitter 1 serves to prevent the penetration of fission gases through ducts 13 and passages 18 into the cesium-vapor-filled discharge chamber 5.

Connecting passages 14 in the emitter 1 and gas outlet ducts 15 in the collector 4 serve to connect all fission gas chambers 3 of the respective elements with one another. The passages 14 and ducts 15 thus permit simultaneous evacuation of all intermediary spaces 16 which occur when the cells are assembled into a unit. The metal-ceramic connection 6, 7, 8 is so constructed that the zones of the ceramic portions thereof which may be endangered by the evolving fission vapor are oriented in a direction away from the outlet openings of passages 14 and ducts 15 which connect the fission gas chambers 3 with each other.

The above-described arrangement of the device according to the invention thus affords a vaccum-tight sealing off of each thermionic element, individually with respect to adjacent elements, so that the respective thermionic elements can each function independently in the over-all assembly.

During preparations for testing the cell, channel 18 is sealed off while the discharge chamber 5 is first evacuated through channel 17 connected thereto. Thereafter, the cesium vapor atmosphere is maintained in discharge chamber 5. During individual testing of the thermionic elements, the emitter 1 is electrically heated through the fission gas chamber 3.

Assembling of the individual cells into a unit is effected in such manner that, subsequent to the interconnection the discharge chambers 5 are connected to each other via channels 13, 17 and 18. The plate 9 and the projection 20 are soldered or welded at the front faces 19. Insulation 23 is provided between the collector 4 and cladding parts 22 to separate these parts from the collector 4. The front faces 21 of these parts are finally welded together thus forming the cladding of the rod.

In addition to affording a possibility for individual testing of the thermionic elements, the above described construction according to the present invention has the further advantage of requiring a minimum of metal-ceramic parts as compared to priort-art devices. Since metal-ceramic parts are highly susceptible to trouble, the entire device according to the invention is thereby made safe for operation.

It will be obvious to those skilled in the art, upon studying this disclosure, that devices according to this invention can be modified in various respects and hence may be embodied in apparatus other than particularly illustrated and described herein, without departing from the essential features of this invention and within the scope of the claims annexed hereto.

What is claimed is:

1. In a thermionic fuel rod having nuclear fuel and having a plurality of closely adjacent thermionic elements electrically connected in series and provided with means forming vacuum-separated discharge chambers and with tubular concentrically positioned emitters and collectors, the improvement comprising rigid, metal-ceramic sealing means forming a mechanical and electrical mutual separation of a respective thermionic element from another of said elements adjacent thereto, and yieldable, metal-ceramic means forming a vacuum-tight seal at each of said discharge chambers.

2. In a thermionic fuel rod according to claim 1, said sealing means including a rigid metal-ceramic component located at one end of said respective thermionic element, and yieldable means at the other end of said element, and vacuum-tight plate means acting in conjunction with said yieldable means to form a vacuum-tight joint therewith.

3. In a thermionic fuel rod according to claim 2, means forming a tubular projection at one end of the emitter of said respective thermionic fuel element, means mechanically and electrically connecting said tubular projection with the collector of an adjacent one of said thermionic elements, means forming a fission gas chamber, and means forming a gas outlet duct for said fuel rod, said projection being provided with a connecting passage between said fission gas chamber and said outlet duct and with another passage leading from said discharge chamber to the discharge chamber of an adjacent one of said thermionic elements.

4. In a thermionic fuel rod according to claim 2, said rigid metal-ceramic component comprising two disc-shaped metallic members and a ceramic ring intermediate said two disc-shaped members.

5. In a thermionic fuel rod according to claim 4, said yieldable means including a metal-ceramic component having a ceramic guide member and a guide ring slidable along said guide member.

6. In a thermionic fuel rod according to claim 5, the thermal resistances of said tubular projection and of said plate means being selected and dimensioned in such manner that said disc-shaped members and said intermediate ceramic ring remain at a substantially uniform temperature during operation.

7. In a thermionic fuel rod according to claim 3, said other passage having an outlet opening leading to said discharge chamber of said respective element, said rigid metal-ceramic component being provided with ceramic portions having zones thereof susceptible to attack by evolving fission vapor, said zones being oriented in a direction away from said outlet opening of said other passage.

References Cited

UNITED STATES PATENTS

| | | | |
|---|---|---|---|
| 3,113,091 | 12/1963 | Rasor et al. | 176—39X |
| 3,201,619 | 8/1965 | Gleason et al. | 176—68X |
| 3,211,930 | 10/1965 | Clement et al. | 176—68X |
| 3,215,868 | 11/1965 | Pidd et al. | 176—39X |
| 3,321,646 | 5/1967 | Grover et al. | 310—4 |
| 3,259,766 | 7/1966 | Beckjord et al. | 176—39X |
| 3,329,839 | 7/1967 | Devin | 310—4 |
| 3,330,974 | 7/1967 | Wilson | 176—39X |

CARL D. QUARFORTH, Primary Examiner

M. J. SCOLNICK, Assistant Examiner

U.S. Cl. X.R.

310—4; 176—39